Aug. 12, 1924. 1,504,702
S. B. NEWBERRY
PROCESS FOR BURNING CEMENT CLINKERS
Filed July 7, 1921 3 Sheets—Sheet 2
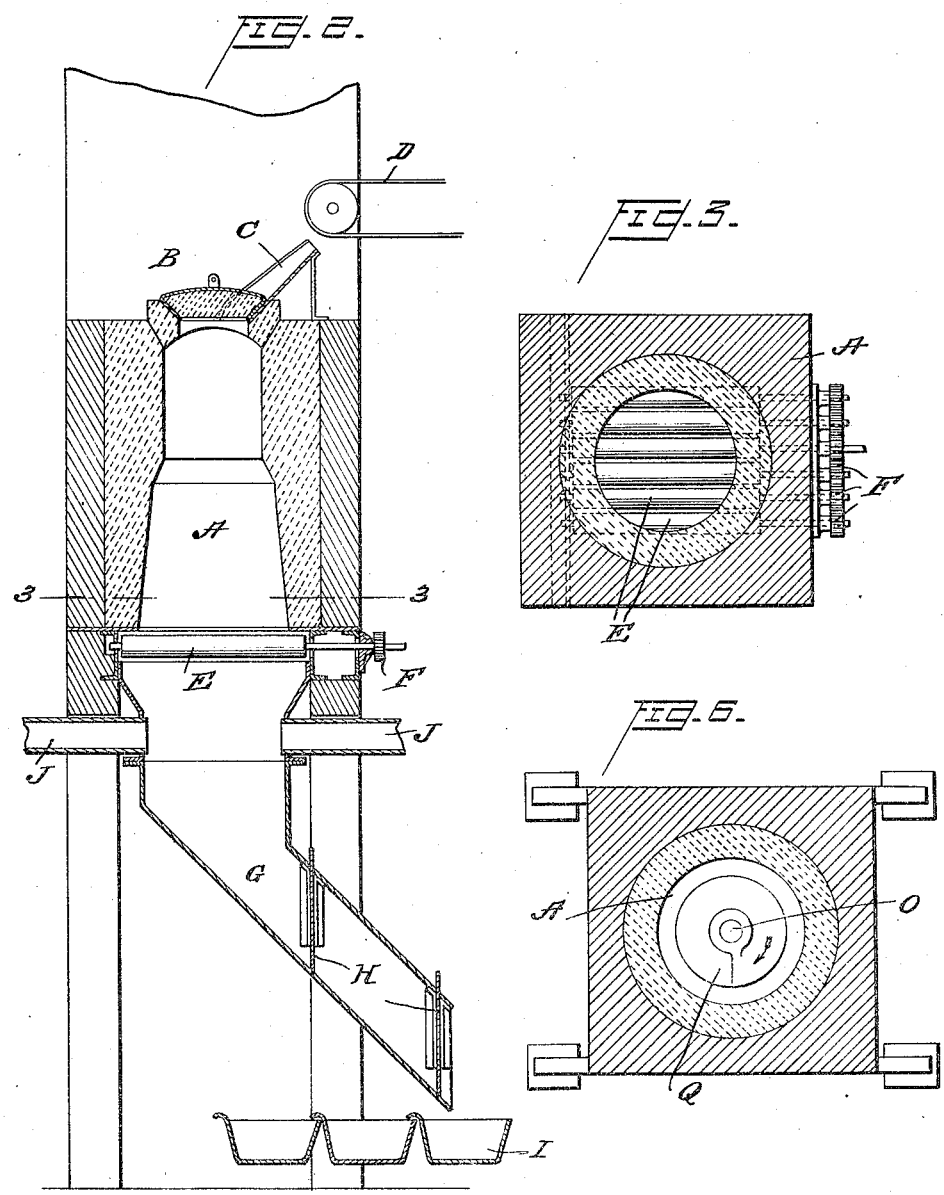

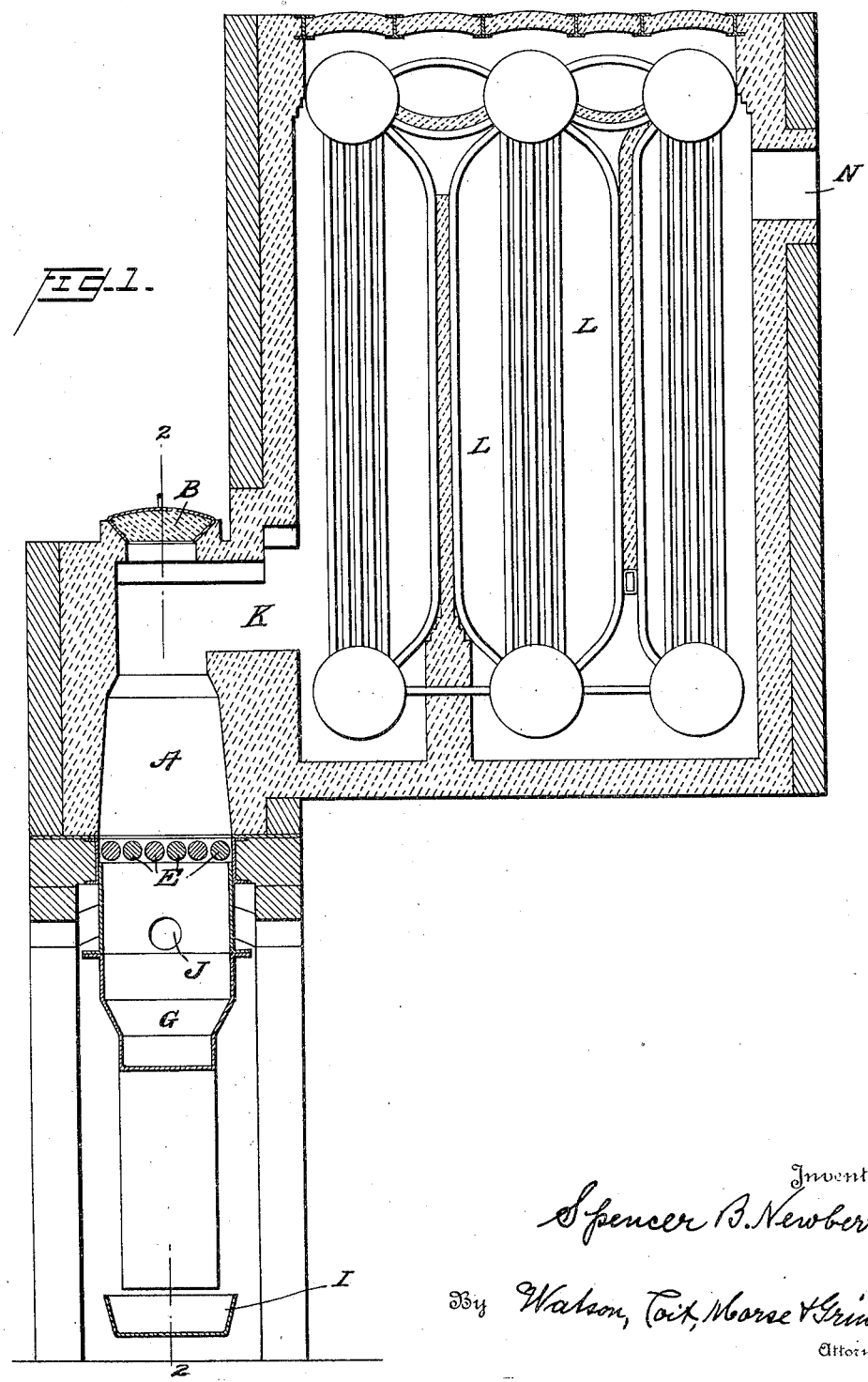

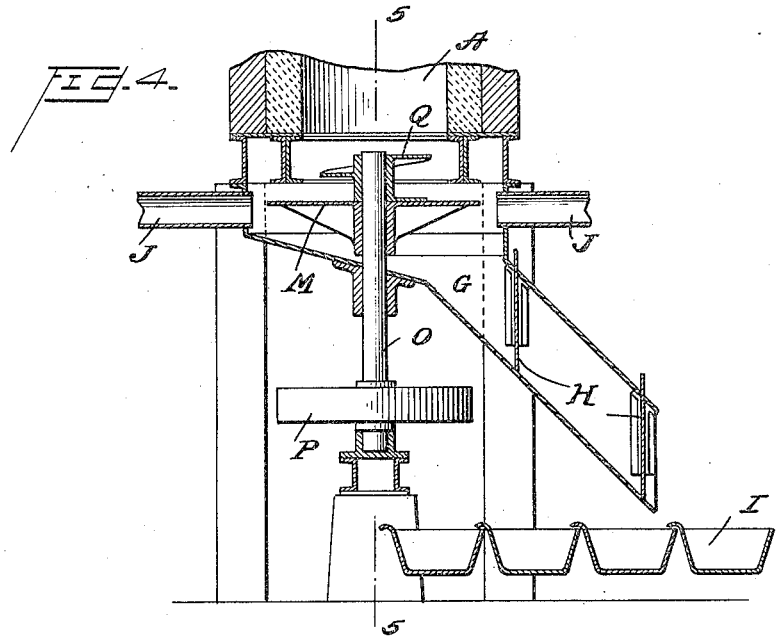
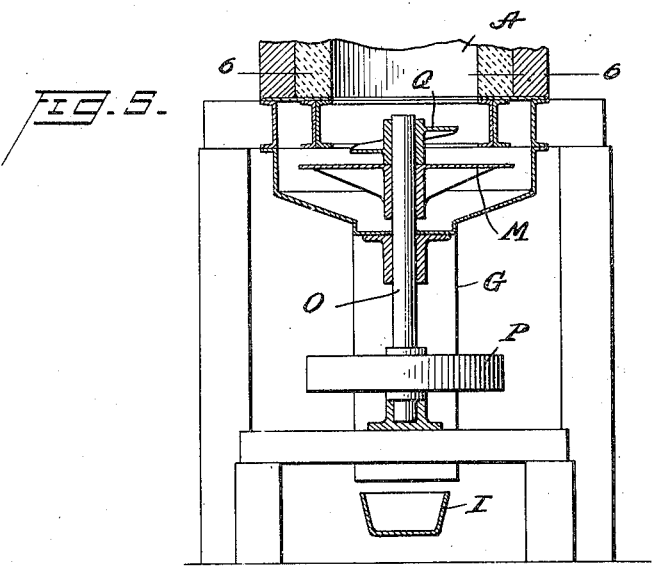

Patented Aug. 12, 1924.

1,504,702

UNITED STATES PATENT OFFICE.

SPENCER B. NEWBERRY, OF CLEVELAND, OHIO; ANDREW W. NEWBERRY, EXECUTOR OF SAID SPENCER B. NEWBERRY, DECEASED, ASSIGNOR OF ONE-HALF TO ANDREW W. NEWBERRY AND ONE-HALF TO ARTHUR C. NEWBERRY.

PROCESS FOR BURNING CEMENT CLINKERS.

Application filed July 7, 1921. Serial No. 483,084.

*To all whom it may concern:*

Be it known that I, SPENCER B. NEWBERRY, a citizen of the United States, and residing at Cleveland, Cuyahoga County, State of Ohio, have invented certain new and useful Improvements in Processes for Burning Cement Clinkers, of which the following is a specification.

This invention relates to a process for burning cement clinkers.

Portland cement is ordinarily made by calcining mixed cement materials in revolving kilns by the heat of coal dust blown in with air at the lower end of the kiln. This is not economical of fuel and has the disadvantage that the ash of the coal is deposited on the outside of the lumps of clinker, producing an over-clayed condition of the surface, impairing the quality of the cement produced, and tending to cause the clinker to fuse together and adhere to the walls of the kiln, forming rings of clinker which disturb the uniformity of the process. It is also difficult to obtain in the rotary kiln the high temperature required for maximum development of the active hydraulic agents of cement, owing to difficulty in exactly regulating the proportion of air blown in with the fuel, and the corroding effect of the clinker on the kiln lining if a temperature higher than that ordinarily employed is produced. My experiments have proved that a higher temperature than that which it is possible to obtain in a rotary kiln, applied to the clinker for a very short time, combined with quick cooling of the product, developed a quality of cement not obtainable by the ordinary process, and also greatly reducing the amount of fuel required, with other advantages in operation as hereinafter set forth. The usual temperature of cement burning in rotary kilns is 2600 to 2700 degrees F. I have found that a temperature of 2800 to 3000 degrees F. may be easily developed and the calcination of the material effected in an extraordinarily short time with the production of cement of a quality heretofore unknown, by the process hereinafter set forth.

To the mixture of calcareous and argillaceous material in suitable proportions, containing the maximum of lime consistent with soundness of product, is added an amount of carbonaceous fuel, preferably low in volatile matter, such as anthracite culm, coke breeze or semi-bituminous slack, equal to from 13 to 20 per cent of the weight of the raw cement mixture, and the mixture ground to great fineness by wet or dry process, preferably to such fineness that at least 90 per cent shall pass through a sieve of 200 meshes to the linear inch. In proportioning the cement mixture, account must be taken of the ash of the fuel, as this ash is argillaceous in composition and replaces a certain proportion of the clay or shale used in the mixture. Fuels containing as much as forty or fifty per cent of ash, such as carbonaceous shale or "bone coal" which are useless for most other purposes, may therefore be successfully used. The finely ground mixture of cement material and fuel is brought by partial drying or addition of water to the consistency of a stiff paste containing approximately 12 to 20 per cent water, molded by pressure into masses preferably not over one inch in thickness, or squeezed out in the form of cylindrical streams from an auger brick machine, and cut up as it issues from the machine into pieces preferably not more than two inches in length. These operations of compressing into solid masses or forcing in plastic condition into elongated form are well known in the manufacture of clay products.

The mixed materials, compressed as above described, are partially or completely dried on slowly moving belts by exposure to hot gases resulting from the burning operation, or introduced in a moist state without drying to the top of the kiln hereinafter described.

The kiln consists of a vertical chamber of circular section, of slightly larger diameter at the base than at the top, preferably lined with magnesite or other basic brick, and provided with apparatus at the bottom for the gradual discharge of the clinker and for admission of air at a pressure sufficient to force it rapidly through the charge in the kiln, for example, from 8 to 16 ounces per square inch.

The accompanying drawings show the construction of a novel apparatus which I have designed and found suitable for carrying on the process herein described.

In the drawings:

Figure 1 is a vertical section through the kiln showing a steam boiler heated by the escaping products of combustion;

Figure 2 is a vertical section through the kiln on the line 2—2 of Figure 1 looking towards the left of Figure 1;

Figure 3 is a cross section looking down on the line 3—3 of Figure 2;

Figure 4 is a vertical section through the lower part of the kiln showing a modified construction for supporting and agitating the material in the kiln;

Figure 5 is a vertical section on the line 5—5 of Figure 4; and

Figure 6 is a cross section looking down on the line 6—6 of Figure 5.

A is a small vertical continuous kiln, which may be of 3 to 4 feet in diameter, somewhat larger at the base than at the top, and 4 or 5 feet in height. At the top of the kiln is a lid B which, when raised, permits the entrance of raw material from the conveyor D, through the chute C. The kiln is preferably provided with an inner lining of magnesite brick, or other refractory material. At the bottom of the kiln is a series of rollers E, driven by the gears F, which serve to crush up any coherent masses of clinker and to discharge the clinker regularly from the bottom of the kiln into the chute G, provided with gates H—H which may be lifted alternately permitting the clinker to accumulate against the lower gate and then to issue into the conveyor I, while the upper gate is closed, thus causing no material loss of air pressure in the chute G. A known type of continuous conveyor may be used and in the drawings it is shown only diagrammatically as including a series of open top receptacles connected together. The air required for combustion enters through the pipes J—J, preferably under a pressure of 8 to 16 ounces, and passes up through the mass of material in the kiln. On entering at the bottom of the kiln the air first meets a layer of hot clinker and is heated by passing through this, thus cooling the clinker before it is discharged. The air then passes up through the mass of nodules of material containing admixed fuel and causes the combustion of this fuel with evolution of very intense heat. The temperature developed is greatest toward the top of the kiln and at the zone of highest heat a temperature of 2800 degrees to 3000 degrees F. may be developed. The hot gases from this burning zone then pass through a layer of unburned material, heating this to the point of combustion, and finally pass through the flue K into the boiler L—L, in which steam is developed for use in producing the power required for the raw grinding of the cement materials and of the finished clinker. The gases finally emerge from the boiler through the flue N and are conveyed to a stack not shown.

An alternative device for the discharge of clinker at the base of the kiln A is shown in Figures 4, 5 and 6 and consists of a revolving table M driven by the shaft O and the pulley P. This table M may be perforated to permit passage of air, which also finds its way around the edges of the table through the space provided. Resting on and attached to the table is a spiral agitator Q, similar to a section of spiral screw conveyor, which revolving with the table M imparts to the material in the kiln a slow, spiral motion, thus preventing agglomeration of the clinker, and causes the clinker to be continuously drawn downward and discharged from the edges of the table M. As an additional means of promoting the discharge of the clinker, a fixed scraper, just above the table M, and not shown in the drawing, may be added.

The essential features of this invention which constitute a departure from and improvement upon the methods of cement burning hitherto known and employed are:

1. The use of fuel low in volatile matter and containing any amount of ash up to the total quantity of argillaceous matter required in the mixture, and so proportioning the mixture that the amount of argillaceous material contained in it, including the ash of the fuel, shall be such as to give the highest quality of resulting cement on quick burning at higher temperature than that commonly employed.

2. Grinding the mixture including the fuel to such fineness that the ash of the fuel shall act in the burning as argillaceous matter and enter into combination with the calcareous material to form cement clinker. The fine grinding and intimate admixture also promote the rapid and complete combustion of the fuel and elimination of carbon dioxide from the calcareous material and the development of maximum temperature of combustion.

3. Molding the mixture into firm coherent masses of comparatively small size, for example not over one inch in least thickness. This form gives the charge of material in the kiln a comparatively close-grained structure with small voids between the masses, a condition which promotes the rapid combustion of the fuel to the center of the masses and offers a large surface of contact for the evolved gases and the entering air, by which complete and quick combustion is effected. The molding may be accomplished by bringing the water content, by moistening or partial drying, to 10 to 14 per cent, and compressing the mixture into briquettes, or with 14 to 18 per cent water by use of an auger brick machine, from which the mixture issues in streams of cylindrical or other shape and of small diameter, for example, not over one inch in thickness. These elongated masses may be introduced directly into the kiln, or may be wholly or partially dried by the heat of the waste gases from the boilers, and cut or broken up into pieces of suitable length, preferably not over two inches long.

4. Burning the mixture in a vertical kiln in a layer of small depth, for example 3 to 5 feet, by the combustion of the admixed fuel supported by a strong blast of air under pressure blown through the charge. At a bright red heat carbon dioxide is evolved from the mixture and is at once reduced to carbon monoxide by contact with the carbon of the admixed fuel. This carbon monoxide issues continually from the masses of mixture in the zone of high heat, and it is essential that enough air shall be supplied to the spaces between the masses to completely burn this carbon monoxide before the gases reach the surface of the charge, in order that escape of unburned gaseous products and consequent loss of heat shall be avoided. With the mixture in the form of masses of not more than one inch in least thickness and a total height of charge of 3 to 5 feet, air pressure of 8 to 16 ounces at the bottom of the kiln is sufficient. It is important that the pressure of blast shall be so adjusted that the amount of air supplied shall be as nearly as possible that required for complete combustion of the fuel. Correct adjustment of air supply is shown by the formation of very little flame at the top of the charge, which would appear as short jets not over one foot in length. Absence of all flame indicates excess, and presence of long luminous flames a deficiency of air.

To prevent agglommeration of the clinker at the high temperature developed, it is important that the charge in the kiln shall be kept in uniform and fairly rapid motion in its descent through the kiln. The small vertical depth of the charge is favorable to this effect, which is accomplished by the mechanical agitation to which the material is subjected by the action of the discharge rollers or revolving plate at the base of the kiln as described. This discharge apparatus should be so regulated that the passage of the material through the kiln shall require 20 to 30 minutes, of which not more than 8 to 12 minutes are occupied by passage through the zone of high heat. In normal operation, with a depth of charge of 4 feet, the lower 1½ to 2 feet will be filled with burned clinker, cooled by imparting its heat to the ascending air; above this is the zone of high heat, occupying 1 to 1½ feet, and finally the upper or pre-heating zone, approximately 1 foot in height. It is of course understood that these zones or stages merge into each other without definite separation.

The operation of grinding the clinker to cement is the same as in ordinary practice, except that owing to the complete absence of slagging or fluxing effect of the ash of the fuel, due to the fine grinding and intimate admixture of the fuel with the materials, the clinker obtained by this process is extraordinarily soft and easy to grind to fine powder.

While the specific details of the process and apparatus have been disclosed for the purpose of practical illustration, it will be understood that the invention is not limited to those particular details beyond what the claims indicate.

Having thus described my invention what I claim as new and desire to secure by Letters Patent is:

1. The process of burning cement clinker by finely grinding cement raw materials with carbonaceous fuel, molding the mixture into small masses, burning the so prepared mixture in a vertical kiln by the combustion of the admixed fuel supported by a strong blast of air blown in at the base of the kiln.

2. The process of burning cement clinker by finely grinding cement raw materials with carbonaceous fuel, so proportioning the mixture that the ash of the fuel shall replace an equivalent amount of the argillaceous matter of the mixture, molding the mixture into small masses, burning the so prepared mixture in a vertical kiln by the combustion of the admixed fuel supported by a strong blast of air blown in at the base of the kiln.

3. The process of burning cement clinker by finely grinding cement raw materials with 13 to 20 per cent by weight of carbonaceous fuel low in volatile matter, so proportioning the mixture that the ash of the fuel shall replace an equivalent amount of the argillaceous matter of the mixture, molding the mixture into masses not more than one inch in least diameter, burning the so prepared mixture in a vertical kiln in a layer of not over five feet depth by the combustion of the admixed fuel supported by a strong blast of air blown in at the base of the kiln, under a pressure of 8 to 16 ounces.

4. The process of burning cement clinker by finely grinding cement raw materials with 13 to 20 per cent by weight of carbonaceous fuel low in volatile matter, so proportioning the mixture that the ash of the fuel shall replace an equivalent amount of the argillaceous matter of the mixture, molding the mixture into small masses not more than one inch in least diameter by bringing the mixture to the condition of a stiff plastic paste containing 14 to 18 per cent water and forcing the plastic mixture by pressure into elongated masses, drying the molded mixture by the final waste heat from the burning, burning the so prepared mixture in a vertical kiln in a layer of not over five feet depth by the combustion of the admixed fuel supported by a strong blast of air blown in at the base of the kiln, under a pressure of 8 to 16 ounces.

5. The process of burning cement clinker comprising supplying small coherent masses composed of finely ground cement raw material and carbonaceous fuel to the upper surface of a laterally enclosed and heat insulated body of predetermined height composed of similar masses, forcing a strong blast of air upwardly through said body to support and cause the combustion of the combustible constituents of said masses in said body, discharging the cement clinker at the lower end of said body, the rate of the blast of air forced through the body and the rate of supply and discharge of material being such that the combustible constituents of the said means will be completely burned or consumed as they pass downwardly from the upper end of said body to the lower end.

6. The process of burning cement clinker comprising supplying small coherent masses composed of finely ground cement raw material and carbonaceous fuel to the upper surface of a laterally enclosed and heat insulated body of predetermined height composed of similar masses, forcing a strong blast of air upwardly through said body to support and cause the combustion of the combustible constituents of said masses in said body, discharging the cement clinker at the lower end of said body, the rate of the blast of air forced through the body and the rate of supply and discharge of material being such that the combustible constituents of the said means will be completely burned or consumed as they pass downwardly from the upper end of said body to the lower end, and agitating the body during the passage of air through it.

7. The process of burning cement clinker comprising supplying small coherent masses composed of finely ground cement raw material and carbonaceous fuel to the upper surface of a laterally enclosed and heat insulated body of predetermined height composed of similar masses, forcing a strong blast of air upwardly through said body to support and cause the combustion of the combustible constituents of said masses in said body, discharging the cement clinker at the lower end of said body, the rate of the blast of air forced through the body and the rate of supply and discharge of material being such that the combustible constituents of the said means will be completely burned or consumed as they pass downwardly from the upper end of said body to the lower end and agitating the body during the passage of air through it and causing the air before it enters said body to come in contact with the hot clinker as it is discharged.

8. The process of producing cement clinker comprising forming small coherent masses of cement raw materials and carbonaceous fuel, the constituents of which are so proportioned that the argillaceous matter will be less than that required by an amount which will be replaced by the ash produced when the combustible constituents are burned, laterally confining a body of material composed of said masses and burning the combustible constituents of said masses in said body by passing a regulated blast of air up through the body.

9. The process of producing cement clinker comprising forming small coherent masses of cement raw materials and carbonaceous fuel, the constituents of which are so proportioned that the argillaceous matter will be less than that required by an amount which will be replaced by the ash produced when the combustible constituents are burned, supplying said masses to the upper surface of a laterally enclosed and heat insulated body of predetermined height composed of similar masses, forcing a strong blast of air upwardly through said body to support and cause the combustion of the combustible constituents and discharging the cement clinker thereby produced at the bottom.

10. The process of producing cement clinker comprising forming small coherent masses of cement raw materials and carbonaceous fuel, the constituents of which are so proportioned that the argillaceous matter will be less than that required by an amount which will be replaced by the ash produced when the combustible constituents are burned, supplying said masses to the upper surface of a laterally enclosed and heat insulated body of predetermined height composed of similar masses, forcing a strong blast of air upwardly through said body to support and cause the combustion of the combustible constituents and discharging the cement clinker thereby produced at the bottom agitating the body of material during the passage of air for combustion and disintegrating coherent masses of clinker as they are discharged.

11. A continuous process for producing cement clinker comprising forming small coherent masses of cement raw materials and carbonaceous fuel, the constituents of which are so proportioned that the argillaceous matter will be less than that required by an amount which will be replaced by the ash produced when the combustible constituents are burned, supplying said masses to the upper surface of a laterally enclosed and heat insulated body of predetermined height composed of similar masses, forcing a strong blast of air upwardly through said body to support and cause the combustion of the combustible constituents and continuously discharging the depth of material constituting said body, the rates of supply and discharge and the rate at which air is forced there being such that the body will maintain a substantially constant depth, and the combustion of each mass forming the body will commence below the upper surface and will be complete just before it reaches the bottom.

In testimony whereof I hereunto affix my signature.

SPENCER B. NEWBERRY.